United States Patent [19]

de Rooy

[11] Patent Number: 5,303,813
[45] Date of Patent: Apr. 19, 1994

[54] SEALING APRON DEVICE FOR THE LOADING TROUGH OF A BELT CONVEYOR

[75] Inventor: Johannes J. de Rooy, Cothen, Netherlands

[73] Assignee: Mass Flow Equipment B.V., Da Doorn, Netherlands

[21] Appl. No.: 958,900

[22] Filed: Oct. 9, 1992

[30] Foreign Application Priority Data

Oct. 10, 1991 [NL] Netherlands ................. 9101698

[51] Int. Cl.⁵ ............................................. B65G 47/19
[52] U.S. Cl. ................................. 198/525; 198/836.1
[58] Field of Search ......................... 198/525, 836.1

[56] References Cited

U.S. PATENT DOCUMENTS

| | | | |
|---|---|---|---|
| 4,236,628 | 12/1980 | Stahura | 198/525 |
| 4,874,082 | 10/1989 | Swinderman | 198/836.1 |
| 5,048,669 | 9/1991 | Swinderman | 198/836.1 |
| 5,154,280 | 10/1992 | Mott | 198/525 |

FOREIGN PATENT DOCUMENTS 2208838 4/1989 United Kingdom ............ 198/836.1

Primary Examiner—Joseph E. Valenza
Attorney, Agent, or Firm—Edmund M. Jaskiewicz

[57] ABSTRACT

Sealing apron device for a moving conveyor belt or loading trough of a belt conveyor, has at least one mounting plate which is fitted above the belt and which has a vertically adjustable sealing apron on a side wall. The underside of the apron interacts with the belt for sealing, and the sealing apron comprises a number of adjacent sections which are vertically slidable relative to each other on the mounting plate by means of slide guides on the mounting plate and the apron sections respectively. Each apron section is so fixed to the mounting plate with a clamping plate or bracket and fixing members that an apron section is clamped between the clamping plate and the mounting plate. A friction element between the clamping plate and sealing apron sections permits a downward movement of the section relative to the mounting plate, but impede an upward movement thereof.

8 Claims, 3 Drawing Sheets

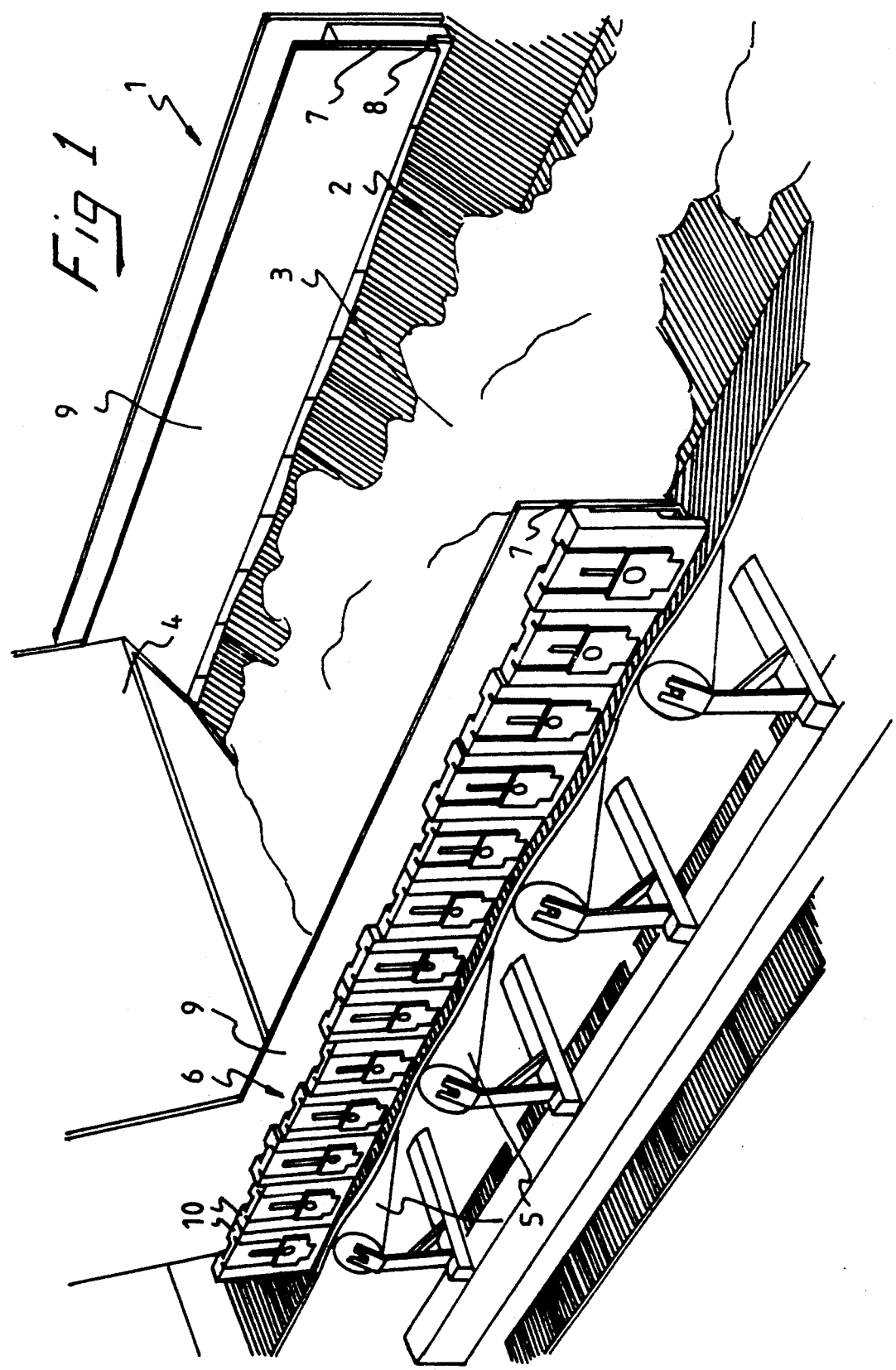

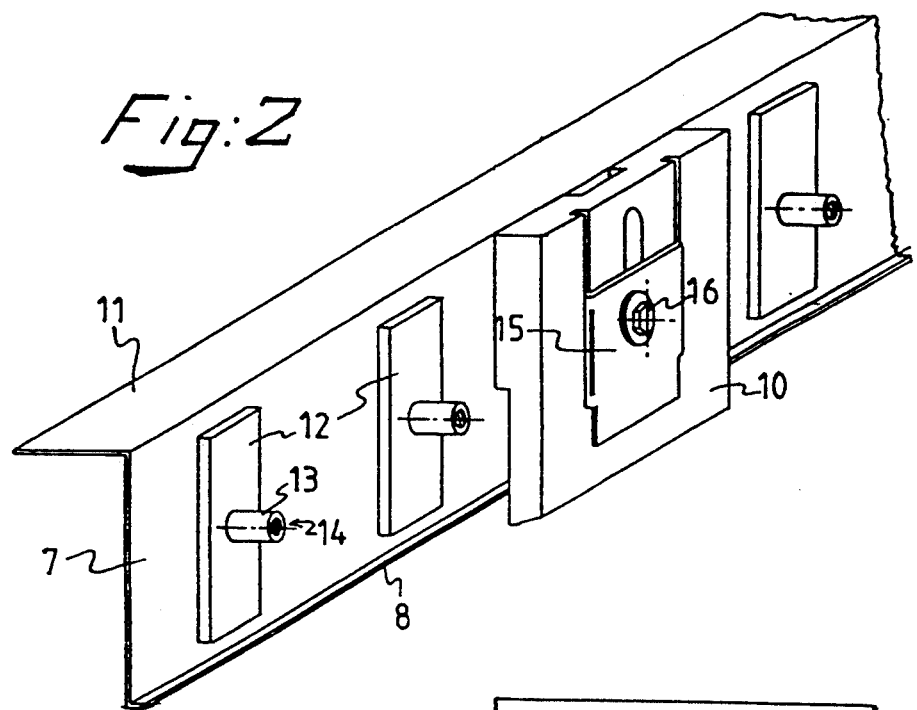
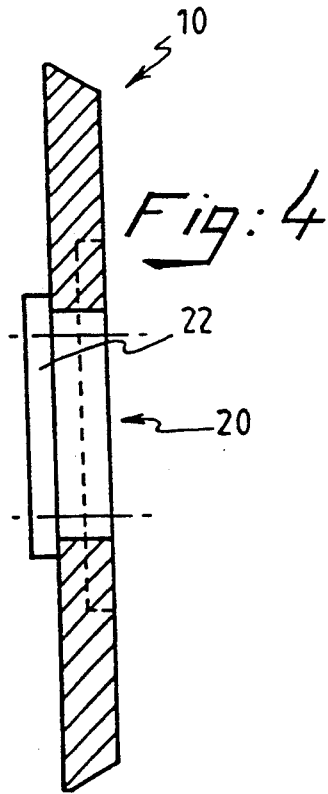
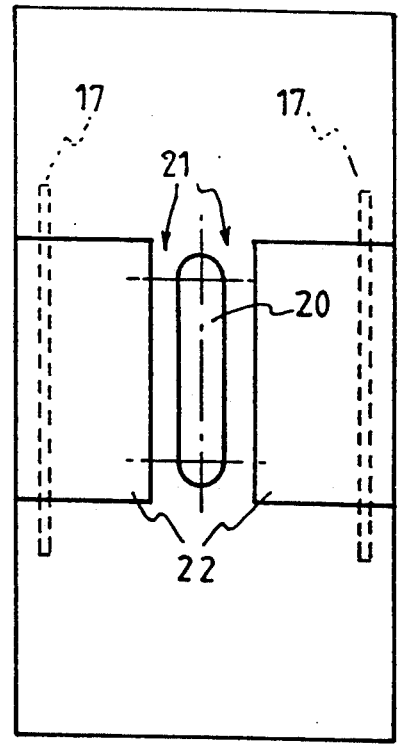
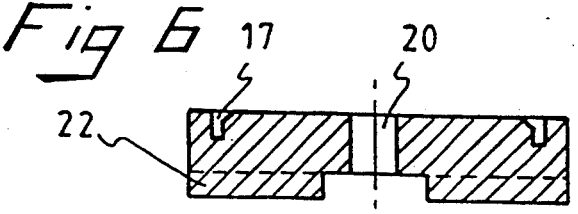

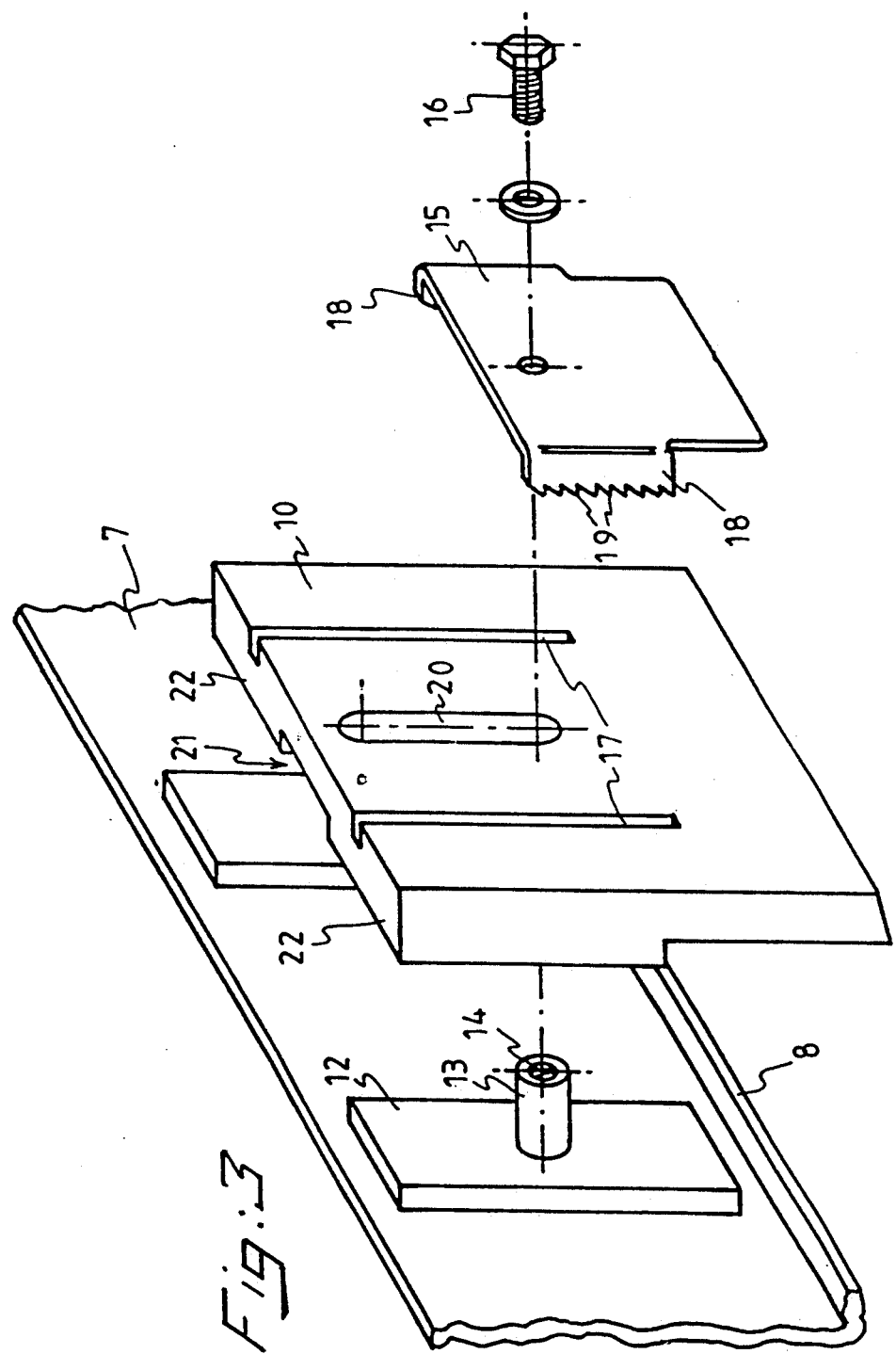

SEALING APRON DEVICE FOR THE LOADING TROUGH OF A BELT CONVEYOR

The invention relates to a sealing apron device or conveyor skirt board for a moving conveyor belt or loading trough of a belt conveyor, provided with at least one mounting plate which is to be fitted above the belt and which bears a sealing apron in a vertically adjustable manner on a side wall, the underside of which apron can interact with the belt for sealing, and which sealing apron is made of a number of adjacent sections which are vertically slidable relative to each other on the mounting plate by means of slide guide means on the mounting plate and the apron sections respectively.

Such a sealing apron device is known from the British Patent Specification GB 2,208,838.

The known sealing apron device has a sealing apron which is made up of a number of adjacent sections which are fixed so that they can slide in the vertical direction on a mounting plate. Each apron section is preferably slotted and individually bolted at a predetermined torque by bolt and nut assembly to the mounting plate. A disadvantage of this method of fixing is that the friction between a clamping plate and the corresponding skirt board section changes very sudden what makes it very difficult to fix each skirt board section with a predetermined torque to the mounting plate. Due to trembling the tension of the predetermined torque changes in time. Another disadvantage is that in order to be able to change the sections, they have to be moved in the vertical direction, i.e. upwards or downwards by means of a hammer. In the downward direction this causes the problem that the predetermined torque changes, while for the vertical movement of the apron sections in the upward direction the disadvantage is that the nut has to be loosened and then fixed to a predetermined torque. Removing the sections forwards, i.e. out of the vertical plane of the mounting plate, is very difficult, and for this three apron sections havae to be loosened, due to the fact that the sections are interconnected to each other by tongues.

Such a sealing apron device is known from American Patent Specification U.S. Pat. No. 4,236,628.

The known sealing apron device has a sealing apron which is made up of a number of adjacent sections which are fixed so that they can slide in the vertical direction on a mounting plate. Each apron section is preferably fixed by means of dovetail-type guides on the mounting plate. A disadvantage of this method of fixing is that, in order to be able to change the sections, they have to be moved in the vertical direction, i.e. upwards or downwards. In the downward direction this causes the problem that the conveyor belt is situated below the sections, while during the vertical movement of the apron sections in the upward direction the disadvantage is that a toothing is present which is for the very purpose of preventing the sections from being able to move upwards in the vertical direction. Removing the sections forwards, i.e. out of the vertical plane of the mounting plate, is very difficult, and for this an apron section has to be more or less broken out, which means that the apron section in question is more or less destroyed and the chance of damage to the remaining apron sections is very great. Another disadvantage is that, if the separate sealing apron sections are adjusted too far downwards, great wear occurs because the pressure of the apron sections on the conveyor belt becomes too great, because the sections cannot be set back up again since the toothing present prevents this. The only way of correcting this faulty setting is to break out the apron sections in the same way as during their replacement and to insert them into their guides again from the top. The chance of damaging the apron section in question and/or the sections lying next to them is very great here.

The object of the invention is a sealing apron device in which a number of apron sections are fixed on a mounting plate, and in which each apron section can be changed in a simple way independently of the other apron sections and if the adjustment is too deep, the faulty setting can easily be corrected.

This object of the invention is achieved with a device through the fact that each apron section can be fixed in such a way to the mounting plate with the aid of a clamping plate or bracket and fixing means that an apron section is clamped between the clamping plate and the mounting plate. The advantage of such a method of composing a sealing apron device is that the clamping plate can be removed in a simple manner, following which the apron section can be removed very easily between the other apron sections. A new apron section can then be fixed in a simple manner on the vacant position, and the new apron section is then fixed tightly on the mounting plate with the aid of the same clamping means.

In a preferred embodiment of the sealing apron device according to the invention, friction means are fitted between the clamping plate and the sealing apron sections, which friction means permit a downward movement of the section on the mounting plate, but impede an upward movement thereof. These measures ensure that the apron sections cannot make an upward movement, which would cause the seal of the sealing apron device to be inadequate.

The clamping plate of the sealing apron device according to the invention is preferably U-shaped in cross-section with legs which extend downward on either side in the direction at right angles to the cross-section and can be accommodated in grooves on either side of the longitudinal hole in each apron section, and the two legs of the U-shaped plate and/or the grooves in an apron section are provided with friction means. It has been found that such a clamping plate holds the apron section very well in a tight fit in the correct position, which prevents the apron sections from being able to turn and any cracks from being able to occur between the different apron sections. Such a U-shaped clamping plate can also be provided very simply with friction means consisting of teeth which are directed in such a way that they permit only a downward movement of the section relative to the mounting plate. Such preferred embodiments make it possible to release a clamping plate fully or partially by undoing the fixing means, with the result that the sealing apron section clamped under it is then also adjustable in the upward direction, because the pressure of the friction elements is removed through the release. This is very useful if, for example, an apron section has been moved too far down, so that too great pressure is being exerted on the conveyor belt.

Making each apron section of the sealing apron device preferably symmetrical both in the longitudinal direction and in the transverse direction means that when one end of such an apron section is worn out it can be turned over and the other end can be used. An apron section is consequently used more efficiently, for the centre part, which is no longer of any use after the apron section is worn out, now lasts twice as long.

In another preferred embodiment of the device, the mounting plate is flanged in the lengthwise direction near the underside, and each apron section is provided with a recess near the underside, so that it can interact with the raised edge of the mounting plate. Such an edge not only strengthens the mounting plate, but also prevents the apron sections from being worn more than is efficient, otherwise the sealing of the apron sections will no longer be adequate. This flanged edge also prevents the accumulation of material between the apron sections and the mounting plate.

The distance between the U-shaped legs of the clamping plate is preferably at least half the width of an apron section, which means that the different apron sections can be fixed well so that they are flat and sturdy. In a preferred embodiment the mounting plate can, if desired, be provided with several guide strips which can interact with several recesses in an apron section, which means that each apron section can be moved only in the vertical direction, and twisting of an apron section can no longer occur at all.

The invention will be explained in greater detail with reference to the drawing. In the drawing:

FIG. 1 shows a part of a loading trough with loading trough hopper and a sealing apron device according to the invention;

FIG. 2 shows a mounting plate with apron section and fixing means according to the invention;

FIG. 3 shows a mounting plate with a number of loose parts of an apron section;

FIGS. 4, 5, 6 show a view and cross-section of another embodiment of an apron section.

FIG. 1 shows a belt conveyor 1 with a moving conveyor belt or loading trough 2 on which the materials 3 to be conveyed are deposited through a chute 4, and are conveyed from there, the conveyor belt 2 being supported by a number of rollers 5. A U-shaped sealing apron device 6 according to the invention is fitted near the position where the chute 4 deposits the materials 3 on the moving belt 2. The sealing apron device 6 comprises a mounting plate 7 consisting of a rigid flat metal plate of which the underside is flanged, thereby forming a flange 8. The device shown in FIG. 1 comprises a mounting plate 7 which is in this case welded to the plates 9 forming the end of the chute 4.

FIG. 2 shows another embodiment of the mounting plate 7 together with a vertically movable apron section 10 of the sealing apron device. In this case the mounting plate 7 is flanged both at the underside, producing a flange 8 at the underside, and at the top, forming a flange 11. A number of guide strips 12 are fitted, for example welded, at equal intervals on the mounting plate 7, on which strips a spacer 13 provided with a threaded hole 14 is fitted. With the aid of a U-shaped clamping bracket 15, a sealing apron section 10 can be fixed in the correct position on the mounting plate 7 by means of a bolt 16. The distance between the guide strips 12 with spacer 13 corresponds exactly to the width of a sealing apron section 10.

FIG. 3 shows the various parts before they are fixed on the mounting plate. The sealing apron section 10 is made of rubber, polyurethane or another soft material. The guide strips 12 are preferably made of steel, but they can also be made of other materials, for example of a smooth plastic, in order to obtain a lower friction. When steel guide strips are used, they are preferably welded onto the mounting plate, and when plastic or other materials are used, screws or pop rivets can, for example, be used for the fixing. The sealing apron sections 10 are provided with two grooves 17 into which the legs 18 of the U-shaped clamping bracket 15 fit. The legs 18 of the clamping bracket 15 are provided with one or more 2 sawteeth 19 which are directed in one direction, with the result that the sealing apron section 10 can be hammered only downwards with a hammer, while the sawteeth 19 at the same time prevent an upward movement of the sealing apron section. The sealing apron sections 10 are also provided with an elongated aperture or longitudinal hole 20 through which said section can move over the spacer 13 in the vertical direction. At the rear side each sealing apron section is provided with a space 21 having on either side projecting parts 22, said space 21 being exactly the same width as the guide strips 12. The projecting parts 22 do not run entirely to the bottom, with the result that when the sealing apron sections are fixed on the mounting plate 7 they can be moved in the vertical direction only until the projecting parts 22 come against the flanged edge 8 of the mounting plate 7. The movement distance of each sealing apron section is also determined by the elongated aperture 20.

FIGS. 4, 5 and 6 show another example of an embodiment of a sealing apron section 10, which in this case comprises a sealing apron section which is symmetrical both in the lengthwise direction and in the transverse direction, which means that both sides of the sealing apron sections can be used.

I claim:

1. Sealing apron device for a moving conveyor belt or loading trough of a belt conveyor, having at least one mounting plate which is fitted above the belt and which bears a sealing apron in a vertically adjustable manner on a side wall, the underside of which apron can interact with the belt for sealing, and which sealing apron comprises a plurality of adjacent sections which are vertically slidable relative to each other on the mounting plate by means of slide guide means on the mounting plate and the apron sections respectively, each said apron section (10) fixed in such a way to the mounting plate (7) with a clamping plate or bracket (15) and fixing means (13, 16 such that an apron section (10) is clamped between the clamping plate (15) and the mounting plate (7) and friction means between the clamping plate (15) and the sealing apron sections (10), for permitting a downward movement of the section (10) relative to the mounting plate (7), but the clamping plate (15) is U-shaped in cross-section with legs (18) which extend downward on either side in the direction at right angles to the cross-section, and can be accommodated in grooves (17) provided on either side of a longitudinal hole (20) in each apron section (10), and in that the two legs (18) of the U-shaped plate (15) and/or the grooves (17) in an apron section (10) are provided with friction means.

2. Sealing apron device according to claim 1, wherein the friction means comprise teeth (19) on the ends of the legs (18) of a clamping plate (15), which teeth are directed in such a way that they permit only a downward movement of the section (10) relative to the mounting plate (7).

3. Sealing apron device according to claim 2, wherein each apron section (10) has a longitudinal hole (20), and the fixing means comprise a bolt (16) which projects through the longitudinal hole (20) of the apron section (10) and can be fixed in a threaded hole (14) in the mounting plate (7).

4. Sealing apron device according to claim 3, wherein the fixing means comprise a spacer (13) such as a tubular projection which is welded on the mounting plate (7), and has a screw thread in which the bolt (16) can be fixed.

5. Sealing apron device according to claim 4, wherein each apron section (10) is symmetrical both in the longitudinal direction and in the transverse direction.

6. Device according to claim 5, wherein the mounting plate (7) is flanged (8) in the longitudinal direction near the underside, and each apron section has a recess near the underside, so that it can interact with the raised edge of the mounting plate.

7. Device according to claim 6, wherein the distance between the U-shaped legs (18) of the clamping plate is at least half the width of an apron section.

8. Device according to claim 7, wherein the mounting plate (7) is provided with several guide strips (12) which can interact with several recesses (21) in an apron section (10).

* * * * *